US011172242B2

(12) United States Patent
Thörn et al.

(10) Patent No.: US 11,172,242 B2
(45) Date of Patent: Nov. 9, 2021

(54) METHODS AND SYSTEMS FOR DELIVERY OF ELECTRONIC MEDIA CONTENT

(71) Applicant: Sony Mobile Communications Inc., Tokyo (JP)

(72) Inventors: Ola Thörn, Lund (SE); Petter Alexanderson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/461,349

(22) PCT Filed: Dec. 2, 2016

(86) PCT No.: PCT/US2016/064703
§ 371 (c)(1),
(2) Date: May 15, 2019

(87) PCT Pub. No.: WO2018/101963
PCT Pub. Date: Jun. 7, 2018

(65) Prior Publication Data
US 2019/0306550 A1 Oct. 3, 2019

(51) Int. Cl.
*H04N 21/25* (2011.01)
*H04N 21/258* (2011.01)
(Continued)

(52) U.S. Cl.
CPC ..... *H04N 21/251* (2013.01); *H04N 21/25841* (2013.01); *H04N 21/25891* (2013.01); *H04N 21/2668* (2013.01); *H04N 21/26208* (2013.01); *H04N 21/2743* (2013.01); *H04N 21/4223* (2013.01); *H04N 21/42201* (2013.01); *H04N 21/44218* (2013.01); *H04N 21/44222* (2013.01);
(Continued)

(58) Field of Classification Search
CPC .......... H04N 21/251; H04N 21/25841; H04N 21/25891; H04N 21/26208; H04N 21/2668; H04N 21/2743
See application file for complete search history.

(56) References Cited

U.S. PATENT DOCUMENTS 9,456,231 B2 * 9/2016 Kulkarni .............. H04N 21/632
2002/0157101 A1 * 10/2002 Schrader ................ H04N 21/84
725/64

(Continued)

OTHER PUBLICATIONS

International Search Report and Written Opinion from corresponding International Application No. PCT/US2016/064703, dated Mar. 22, 2017, 16 pages.

*Primary Examiner* — Sumaiya A Chowdhury
(74) *Attorney, Agent, or Firm* — Tucker Ellis LLP

(57) ABSTRACT

Methods (FIG. 900), systems and the like for determining which users have an interest in receiving media content and determining when to transmit the media content (i.e., which segment/portion of a media content to transmit) based on user characteristics that are related to the user's interest in the media content. Users/viewers are targeted/selected as candidates for receiving media content based on their interest in the event. Specific segments/portions of the event are identified that are of interest to the users/viewers, such that, real-time transmission (e.g., unicast, broadcast, multicast) of the event may be limited to only those segments/portions of the event that are of interest to the users/viewers.

18 Claims, 3 Drawing Sheets

(51) Int. Cl.
*H04N 21/422* (2011.01)
*H04N 21/442* (2011.01)
*H04N 21/262* (2011.01)
*H04N 21/2743* (2011.01)
*H04N 21/472* (2011.01)
*H04N 21/845* (2011.01)
*H04N 21/4223* (2011.01)
*H04N 21/2668* (2011.01)
*H04N 21/45* (2011.01)
*H04N 21/81* (2011.01)

(52) U.S. Cl.
CPC ... *H04N 21/4524* (2013.01); *H04N 21/47214* (2013.01); *H04N 21/814* (2013.01); *H04N 21/8456* (2013.01)

(56) References Cited

U.S. PATENT DOCUMENTS

| | | | |
|---|---|---|---|
| 2005/0076368 A1* | 4/2005 | Lee | H04N 21/434 725/58 |
| 2006/0206258 A1* | 9/2006 | Brooks | G01C 21/34 701/439 |
| 2011/0003665 A1* | 1/2011 | Burton | G06F 13/4282 482/9 |
| 2015/0350358 A1* | 12/2015 | Nguyen | H04N 21/23103 709/204 |
| 2016/0037187 A1 | 2/2016 | Das Jayanta | |

* cited by examiner

METHODS AND SYSTEMS FOR DELIVERY OF ELECTRONIC MEDIA CONTENT

FIELD OF THE INVENTION

In general, embodiments of the invention relate to electronic media content and, more particularly, methods, apparatus, systems and the like for delivery of media content to users based on their determined interest in the content.

BACKGROUND

Currently, applications exist that allow for mobile devices to stream live video. These applications are configured to allow mobile device users to stream live video of an event to selected viewers or to the public, in general.

However, in many instances the event that a mobile device user chooses to live stream is of interest to a minimal number of users and/or only certain portions (herein, referred to as "segments") of the event are of interest to the viewers. In this regard, one challenge that presents itself with live video streaming is locating/targeting users/viewers who may be interested in the event or specific segments of the event being streamed.

Another challenge presents itself, in that, in today's social media environment users demand instant gratification. In this regard, if the user/viewer quickly becomes disinterested in the content of the live video stream, the user/viewer is apt to stop viewing the live streaming video content (i.e., exit the application) and browse other social media that captures their fleeting attention span. If a user/viewer has repeated instances of being disinterested at the onset of a live video stream, the user/viewer will be less likely to use the application in the future, which may ultimately result in the application failing to gain widespread use.

Additionally, while a user/viewer may be highly interested in viewing a specific segment of a live streaming event, the user/viewer is typically unable to determine the point in time when the specific segment will occur and may be unwilling to invest the time required to view the event in its entirety.

From a technical perspective, allowing users to live video stream events can be somewhat problematic. Allowing for a high volume of users to live video stream for prolonged periods of time presents problems in terms of managing the real-time communication of data. For example, live video streams are typically prone to buffering delays due to many factors. Such factors may be attributed to the wireless network, the device streaming the video and/or the viewing device (e.g., slow upload or download speed, minimal bandwidth, exceeding available bit rate, poor routing connection and the like). While certain precautions may be taken be mitigate such delays, the longer in duration that the live video stream lasts, the more likely that buffering delays and/or other technical issues may occur. Moreover, as the length of a live video stream increases, so too does the demand on cloud-based resources required to process the video stream.

As such, a need exists to more efficiently and effectively deliver media content, such as delivery of live streaming video content and the like. The desired methods, systems, apparatus and the like should be configured to provide for streaming of media content to occur only when users/viewers who are interested in the content have been identified and shown a desire to view the content. Moreover, desired methods, systems, apparatus and the like should limit the volume/duration of streaming media content by only streaming those segments of an event in which user(s)/viewer(s) have shown in interest in viewing. By limiting the amount/duration of streaming media content, the desired methods, systems, apparatus and the like result in a more manageable computing environment for delivering live media streaming services, lessening the occurrence of delays in transmission, decreasing processing resources required within a cloud computing environment and the like.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, apparatus, systems or the like for targeting users/viewers for receiving media content (e.g., live video streaming content or the like) based on their interest in the event and, according to specific embodiments of the invention, determining specific segments/portions of the event that are of interest to the users/viewers, such that, real-time transmission (e.g., unicast, broadcast, multicast) of the event may be limited to only those segments/portions of the event that are of interest to the users/viewers.

By limiting real-time transmission to those segments of the event which users/viewers have an interest in viewing, the present invention heightens the user-experience by decreasing the amount of time a user/viewer may have otherwise spent viewing other segments/portions of the event which are of minimal or no interest to the users/viewers. Moreover, from a technical perspective, limiting the real-time transmission to those segments of the event which users/viewers have an interest in viewing results in less demand on the network and processing resources; lessening the likelihood of transmission delays and the like.

Specifically, embodiments of the present invention provide for determining (i.e., predicting) which segments of an event are of interest to one or more users/viewers and, in response to receiving an indication that the segment of the event is proximate to commencing, initiating at least one of (i) real-time transmission (e.g., unicast, broadcast, multicast or the like) of the segment of the event to the users/viewers and/or (ii) recording and storing a media file of the segment of the event for later-in-time viewing by the users/viewers. In further embodiments of the invention, prior to determining the segments of the event that are of interest to the users/viewers, the one or more users are determined from amongst a community of potential users based on the user's interest in the entire event.

In specific embodiment of the invention, determining which segments of an event are of interest to the users/viewers may be based on a comparison between attributes associated with the users/viewers and attributes associated the segment of the event and, in some embodiments of the invention, attributes associated with the participant(s) in the event.

For example, in those embodiments of the invention in which the event is a physical activity event (e.g., cycling, running, skiing or the like), determining which segments of the event are of interest to the users/viewers may involve comparing user/viewers attributes associated with previous similar or same events conducted by the users/viewers to attributes associated with the route/course related to the segment of the event and, in some embodiments of the invention, attributes associated with the participant(s)'s current performance of the event and/or the participant(s)'s previous performance of the same or similar events.

A method for providing media content to one or more users defines first embodiments of the invention. The method includes determining that an impending segment of an event, conducted by a participant, is of interest to one or more users. The determination is based on a comparison between one or more first attributes associated with the impending segment of the event and one or more second attributes associated with the one or more users. The method further includes receiving an indication that the impending segment of the event is proximate to commencing and, in response to determining the segment of the event is of interest to the users and receiving the indication, initiating at least one of (i) a real-time transmission of a media stream of the segment of the event to the one or more users, and (ii) recording and storing of a media file of the segment of the event.

In specific embodiments of the method the event may be defined as at least one of a physical activity event and a travel event. A physical activity event may include, but is not limited to, running, cycling, swimming, an extreme sporting activity or the like. Travel events may include vehicle travel events, such as, but not limited to, automobile, motorcycle, boat, airplane and the like. In further related embodiments of the method, the physical activity event and/or the travel event may be defined as one of a virtual physical activity event and a virtual travel event. In such embodiments of the method, receiving the indication that the impending segment of the event is proximate to commencing further includes receiving an indication that the participant is located proximate to a starting location of the segment of the physical activity event or travel event.

Specific embodiments of the method further include, in response to determining the segment of the event is of interest to the one or more users and receiving the indication, notifying the one or more users of at least one of (i) the real-time transmission of the media stream of the segment of the event, and (ii) the recording and storing of the media file of the segment of the event.

In yet other specific embodiments the method includes tracking one or more performance parameters of the participant during the segment of the event. In such embodiments the method further includes comparing the one or more performance parameters of the participant to one or more previous performance parameters of the one or more users who have previously conducted event(s) that are the same or similar to the segment of the event. In further related embodiments the method includes notifying at least one of the participant and the one or more users of results associated with comparing the one or more performance parameters of the participant to the one or more previous performance parameters of the one or more users.

Additional specific embodiments of the method include determining the one or more users based on another comparison between at least one of a plurality of third attributes associated with a plurality of users and at least one of a plurality of fourth attributes associated with the event. In such embodiments of the method, the third attributes may be defined as event attributes associated with previous events conducted by a corresponding one of the plurality of users and the fourth attributes may be defined as event attributes associated with the event.

In additional specific embodiments of the method, the first attributes are further defined as route attributes associated with a predicted upcoming route for conducting the impending segment of the physical activity event or travel event. In such embodiments of the method, the second attributes are further defined as historical performance attributes associated with the one or more users. The historical performance attributes include one or more previous route attributes associated with previous routes travelled by the one or more users in conducting previous physical activities or previous travels. In such embodiments of the method, the determination is based on the comparison between at least one of the route attributes associated with the predicted route for conducting the impending segment of the physical activity event or travel event and at least one of the previous route attributes associated with the previous routes travelled by the one or more users in conducting previous physical activities or previous travels.

Moreover, in further embodiments of the method the determination is further based on a further comparison between one or more fifth attributes associated with the participant and the at least one of the plurality of second attributes associated with the one or more users. In such embodiments of the method, the fifth attributes may be defined as at least one of current performance attributes of the participant in conducting the event and predicted performance attributes of the participant foreseen in conducting the segment of the event.

A system for providing media content to users, defines second embodiments of the invention. The system includes a computing platform including a memory and at least one processor in communication with the memory. The system additionally includes a media capturing device configured to capture media of an event. In addition, the system includes a relevancy engine that is stored in the memory and executable by the processor. The relevancy engine is configured to determine that an impending segment of the event, conducted by a participant, is of interest to one or more users. The determination is based on a comparison between at least one of a plurality of first attributes associated with the impending segment of the event and at least one of a plurality of second attributes associated with the one or more users. Further, the system includes a segment commencement determination routine that is stored in the memory and executable by the processor. The segment commencement determination routine is configured to determine that the impending segment of the event is proximate to commencing. Moreover, the system includes a media transmission and recording module that is stored in the memory and executable by the processor. The media transmission and recording module is configured to, in response to determining the segment of the event is of interest to the one or more users and receiving the indication, initiate at least one of (i) a real-time transmission, to the one or more users, of media captured by the media capturing device associated with the segment of the event, and (ii) record and store the media captured by the media capturing device associated with the segment of the event.

In further specific embodiments the system includes a notification module that is stored in the memory and executable by the processor. The notification module is configured to, in response to determining the segment of the event is of interest to the one or more users and receiving the indication, notify the one or more users of at least one of (i) the real-time transmission of the media, and (ii) the recording and storing of the media.

In other specific embodiments the system includes a performance tracking and comparison module that is stored in the memory and executable by the processor The performance tracking and comparison module is configured to track one or more performance parameters of the participant during the segment of the event and compare the one or more performance parameters of the participant to one or more performance parameters of the one or more users in conducting one or more previous events that are same or similar to the segment of the event.

A computer program product for providing media content to users including a non-transitory computer-readable storage medium having computer-executable instructions defines third embodiments of the invention. The computer-executable instructions are configured for determining that an impending segment of an event, conducted by a participant, is of interest to one or more users. The determination is based on a comparison between at least one of a plurality of first attributes associated with the impending segment of the event and at least one of a plurality of second attributes associated with the one or more users. The computer-executable instructions are further configured for receiving an indication that the impending segment of the event is proximate to commencing. Additionally the computer-executable instructions are configured to, in response to determining the segment of the event is of interest to the one or more users and receiving the indication, initiating at least one of (i) a real-time transmission of a media stream of the segment of the event to the one or more users, and (ii) recording and storing of a media file of the segment of the event.

Thus, systems, apparatus, methods, and computer program products herein described in detail below provide for determining specific segments/portions of the event that are of interest to the users/viewers, such that, real-time transmission of the event may be limited to only those segments/portions of the event that are of interest to the users/viewers. By limiting real-time transmission to those segments of the event which users/viewers have an interest in viewing, the present invention heightens the user-experience by decreasing the amount of time a user/viewer may have otherwise spent viewing the entire event or time spent viewing other segments/portions of the event which are of minimal or no interest to the users/viewers. Moreover, from a technical perspective, limiting the real-time transmission to those segments of the event which users/viewers have an interest in viewing results in less demand on the network and processing resources; lessening the likelihood of transmission delays and the like.

BRIEF DESCRIPTION OF THE DRAWINGS

Figure 1:
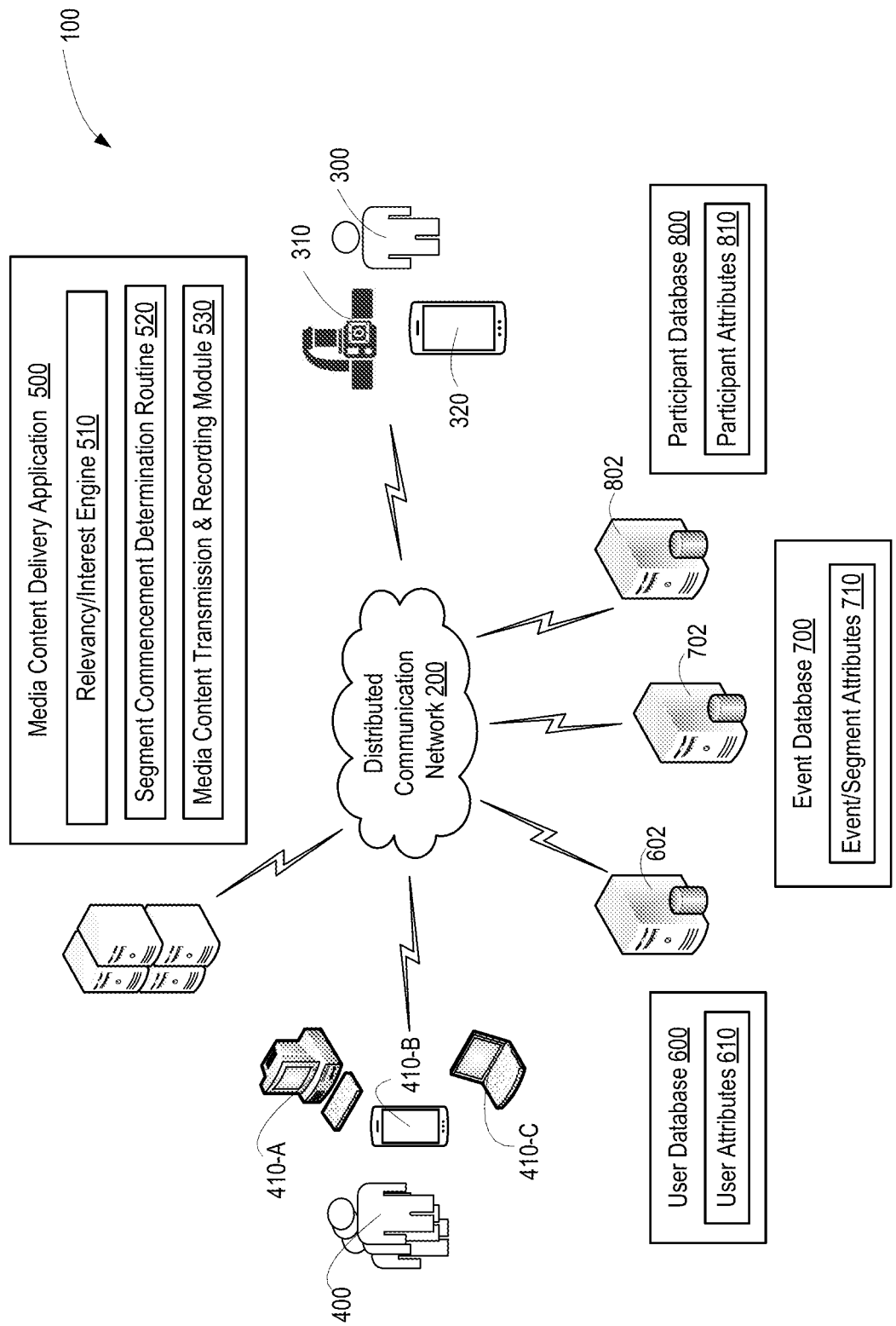
Figure 2:
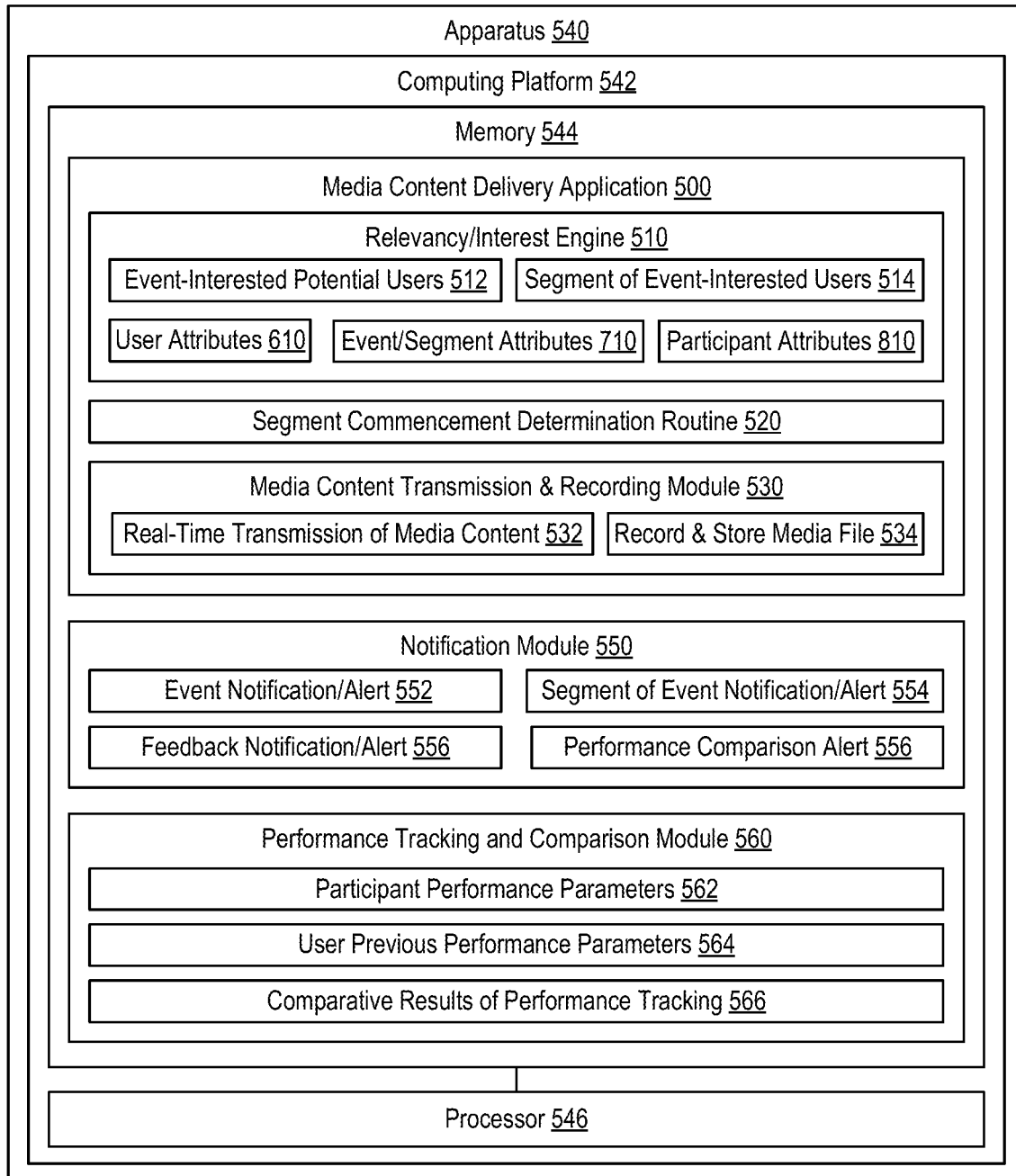
Figure 3:
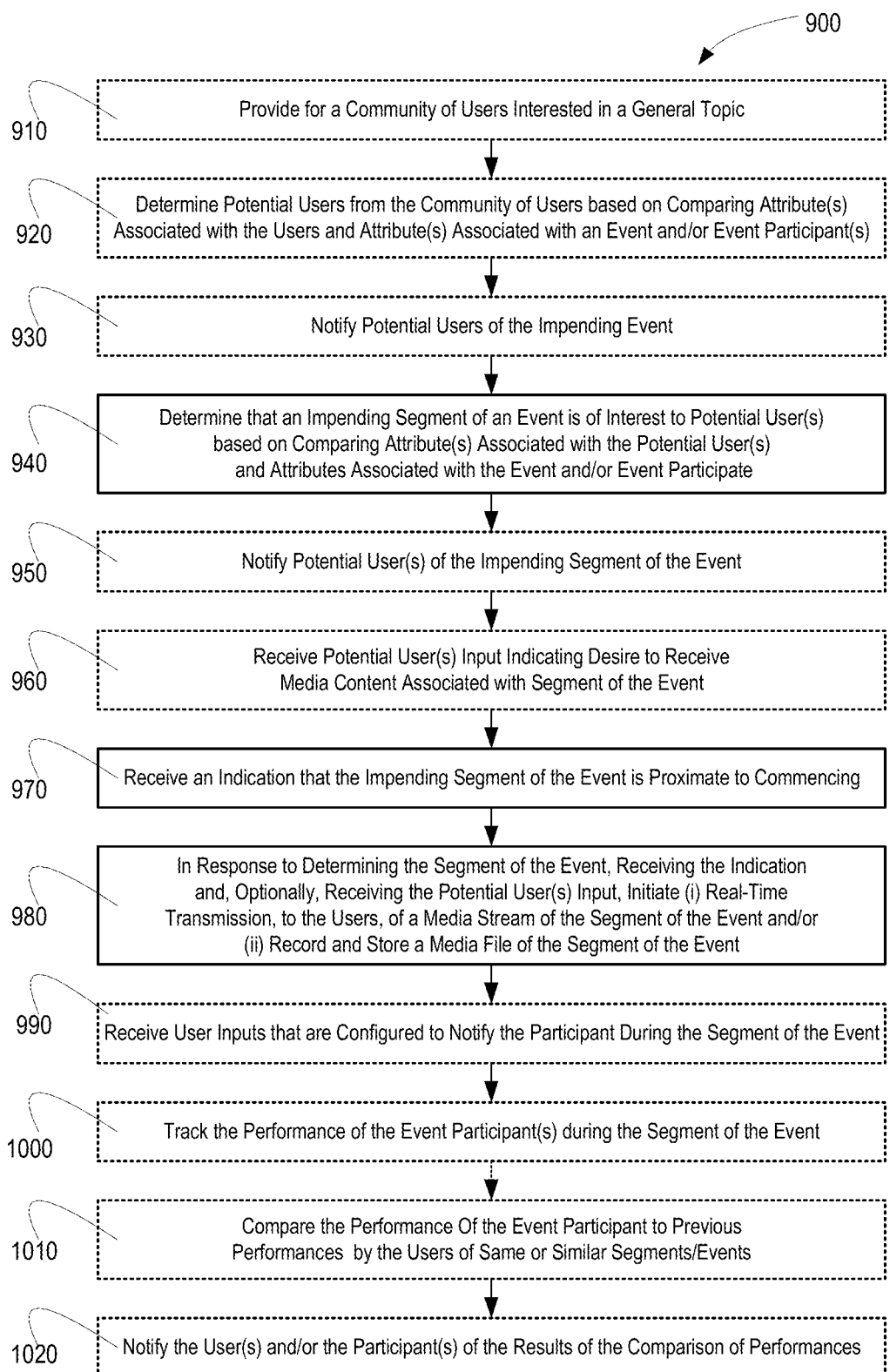

Having thus described embodiments of the invention in general terms, reference will now be made to the accompanying drawings, where:

FIG. 1 is schematic diagrams of a system for media content delivery, in accordance with embodiments of the present invention;

FIG. 2 is a block diagram of a system for media content delivery, in accordance with embodiments of the present invention; and FIG. 3 is flow diagram of a method for media content delivery, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may be referred to as a node or user equipment ("UE"). For the purpose of sending or receiving data, the device may connect to a wireless local area network ("WLAN") or a mobile communication network (including evolution of 3GPP, LTE releases and $5^{th}$ Generation ("5G") New Radio (NR) releases).

As discussed in detail herein, the present invention provides for methods, systems, computer program products or the like for determining when to transmit (e.g., live video streaming or the like) media content based on user characteristics that are related to the user's interest in the media content. In specific embodiment of the invention users/viewers are targeted/selected as candidates for receiving media content based on their interest in the event. In other specific embodiments of the invention, specific segments/portions of the event are identified that are of interest to the users/viewers, such that, real-time transmission (e.g., unicast, broadcast, multicast) of the event may be limited to only those segments/portions of the event that are of interest to the users/viewers.

By limiting real-time transmission to those segments of the event which users/viewers have an interest in viewing, the present invention heightens the user-experience by decreasing the amount of time a user/viewer may have otherwise spent viewing the entire event or viewing other segments/portions of the event which are of minimal or no interest to the users/viewers. Moreover, from a technical perspective, limiting the real-time transmission to those segments of the event which users/viewers have an interest in viewing results in less demand on the network and processing resources; lessening the likelihood of transmission delays and the like.

Specifically, embodiments of the present invention provide for determining (i.e., predicting) which segments of an event are of interest to one or more users/viewers and, in response to receiving an indication that the segment of the event is proximate to commencing, initiating at least one of (i) real-time transmission (e.g., unicast, broadcast, multicast or the like) of the segment of the event to the users/viewers and/or (ii) recording and storing a media file of the segment of the event for later-in-time viewing by the users/viewers.

In specific embodiment of the invention, determining which segments of an event are of interest to the users/viewers may be based on a comparison between attributes associated with the users/viewers and attributes associated the segment of the event and, in some embodiments of the invention, attributes associated with the participant(s) in the event.

For example, in those embodiments of the invention in which the event is a physical activity event (e.g., cycling, running, skiing or the like), determining which segments of the event are of interest to the users/viewers may involve comparing user/viewers attributes associated with previous similar or same physical activity events participated in by the users/viewers to attributes associated with the predicted upcoming segment route/course and, in some embodiments of the invention, attributes associated with the participant(s)'s current performance of the event and/or the participant(s)'s previous performance of the same or similar events. In this regard, a segment of interest may be determined based on a comparison that indicates that a user previously participated in a similar or same segment of the event and/or participated at a specified level of performance for the similar or same segment of the event.

Referring to FIG. 1 a schematic diagram is provided of a system 100 for delivering media content, in accordance with an embodiment of the present invention. The system includes a distributed communication network 200 capable of delivering media content, such as multimedia content, image content, video content, audio content, or the like. In specific embodiments of the invention, the distributed communication network may include a wireless local area network ("WLAN"), a mobile communication network (including evolution of 3GPP, LTE releases and $5^{th}$ Generation ("5G") New Radio (NR) releases) and/or the Internet.

A user/participant 300 participates in an event. In specific embodiments of the invention, the event may be a physical activity event, such as, but not limited to, cycling, running, skiing, or the like and/or a travel event, such as, but not limited to, automobile motorcycle, boat, airplane travel or the like. In other embodiments of the invention, the event may be a virtual event, such as a virtual physical activity event or virtual travel event, in which the user/participant does not actually participate but rather experiences a virtual environment in which the physical activity or travel occurs. In such embodiments of the invention, the virtual event may be configured as part of a gaming experience or the like.

In accordance with embodiments of the invention, the user/participant 300 possesses (or is otherwise associated with) a media-capturing device (e.g., image/video-capturing device or the like) that is configured to capture media associated with the event that the user/participant participates in. The media capturing device is further configured to initiate real-time transmission (e.g., unicast, broadcast, multicast) of a media stream of the captured content and/or record and store a media file of the captured media content. In the illustrated embodiment of FIG. 1, the media capturing device is a head-mounted video-capturing device 310, such as may be worn by the user/participant when participating in physical activity event, such as cycling, running, skiing or the like. In other embodiments of the invention, the media capturing device may be a handheld device, such as a mobile communication device 320 or the like having media-capturing capabilities. In further embodiments of the invention, the media capturing device may be affixed to a vehicle (e.g., affixed to a bicycle, a motorcycle, an automobile, a boat or the like). In specific embodiments of the invention, the media-capturing device 310, 320 is directly connected to the distributed communication network 200, such that the media-capturing device 310, 320 is capable of real-time transmission of a media stream. In other embodiments of the invention the media-capturing device 320, 320 may be in wired and/or wireless communication (e.g., short-range wireless communication or the like) with another device capable of connecting to the distributed communication network 200 and/or storing a media file of the captured media content. For example, in the embodiments shown in FIG. 1, the head-mounted video-capturing device 310 may not have a direct connection to the distributed communication network 200, and, as such, once media/video is captured by the head-mounted video-capturing device 310, the media/video may be communicated (wired or wirelessly) to the mobile communication device 320, which may initiate real-time transmission of the media content and/or record and store the media content in a media file.

Users 400 (also, referred to herein as viewers) are interested in the event that user/participant 300 participates in. For example, users 400 may belong to a community of users (e.g., social media community or the like) that has an interest in a general topic (e.g., cycling, running, skiing, travel, virtual reality/gaming or the like). As such, users 400 may have a desire to be presented media content (e.g., multimedia, video, audio or the like) of the user/participant 300 participating in the event associated with the general topic. In specific embodiments of the invention, users 400 may be presented real-time transmission of a media stream of the event or a segment/portion of the event. A segment of the event, as used herein, may comprise a portion of the event (i.e., less than the entire event), such as the remaining portion of the event or may, in some embodiments of the invention, comprise the entire event. In other embodiments of the invention, users 400 may be presented access to stored media files that comprise the captured media content of the event or segment of the event, such that the users may view or otherwise consume the media content at a later point in time. Thus, as shown in FIG. 1 users 400 are in possession of (or otherwise are associated with) a media content delivery device 410, such as Personal Computer (PC) 410-A, mobile communication device 410-B, laptop computing device 410-C that are in wired and/or wireless communication with distributed communication network 200 and configured to receive and output (via a display, speaker and/or the like) the real-time transmissions of media content of the event and/or segment of the event and/or access stored media files of the event and/or segment of the event for later-in-time output (via display, speaker and/or the like) of the media content.

System 100 additionally includes application server 500 that is configured to store and execute media content delivery application 500, in accordance with embodiments of the present invention. Media content delivery application 500 may be configured as a cloud-based service and, thus, application server 500 may be a virtual server or the like. Moreover, while the embodiments shown in FIG. 1 describe the functionality of the media content delivery application as being executed solely within the application server 500, in other embodiments of the invention any and/or all of the functionality of media content delivery application 500 may be executed at the user/participant's computing device (e.g., media content-capturing device, including head-mounted video-capturing device 310 and/or mobile communication device 300) and/or the user/viewer's computing device (e.g., PC 410-A, mobile communication device 410-B, laptop 410-C or the like).

Media content delivery application 500 includes relevancy/interest engine 510 that is configured to determine that an impending segment of an event, conducted by the user/participant 300, is of interest to one or more users 400. A user 400 may have interest in a segment of the event if the user 400 has previously participated in the same or a similar segment of an event and/or performed at a same or similar level as the current or predicted performance of the participant 300. Thus, in specific embodiments of the invention, the determination is based on a comparison of attributes associated with the users 400 and attributes associated with at least one of the event and/or the user/participant 300. In this regard, the relevancy/interest engine 510 is configured to access, via distributed communication network 200, database server 602, which stores user database 600 to retrieve user attributes 610 and at least one of database server 702 which stores event database 700 to retrieve event/segment attributes 710 and/or database server 802, which stores participant database 800 to retrieve participant attributes 810.

For example, in specific embodiments of the invention, the user attributes 610 may be attributes associated with previous events conducted by the users and the event attributes 710 may be associated with the route/course that the event or segment of the event is or will be (i.e., predicted upcoming) conducted on. In such embodiments of the invention, the comparison may entail comparing user attributes 610 associated with previous events conducted by the user to event attributes associated with the route/course to determine if the user has previously participated in the same or a similar route/course (e.g., user has cycled, ran or skied the same route/course or a similar route course). A similar route/course may be determined based on the user's previous routes/courses having similar characteristics to the current route/course or segment of the route/course, e.g., similar length, similar elevation or slope, similar physical (e.g., terrain) or environmental (e.g., climate, temperature) conditions.

In other specific embodiments of the invention, the user attributes 610 may be attributes associated with previous events conducted by the users and the participant attributes 810 may be associated with the participant's current performance of the event and/or previous performance of the same or similar events. As such, embodiments of the invention may further entail monitoring the participant's performance to determine performance attributes and, in some embodiments of the invention, predicting the participant's future performance (i.e., performance during the impending segment) based on the participant's current performance and/or previous same/similar performances. Performance attributes may include both physical performance attributes (e.g., speed, acceleration, time to complete the event and/or segment of the event and the like) as well as biometric attributes (e.g., internal and/or external temperature, heart rate, pulse, stress, Galvanic Skin Response (GSR) (i.e., similar emotional state) and the like). In such embodiments of the invention, the comparison may entail comparing user attributes 610 associated with previous events conducted by the user to participant attributes associated with the current performance of the participant and/or previous performance of the determine if the user has previously performed at the same or a similar level of performance as the participant's current or previous performance level. A similar level of performance may be determined based on the user's previous performance attributes being similar to the current and/or previous performance attributes of the participant e.g., similar speed, similar acceleration, similar biometric attributes (e.g., similar internal/external/temperature, similar pulse/heart rate, similar GSR or the like).

The media content delivery application 500 further includes segment commencement determination routine 520 that is configured to determine that the participant 300 is proximate to commencing the segment of the event that has been determined to be of interest to one or more of the users 400. Such determination may be made based on location determining mechanisms (e.g., Global Positioning System (GPS) mechanisms) implemented in the participant's mobile communication device 320 or the like, which determine the geophysical location of the mobile communication device and, thus, the user. The user's current location may be compared to a known or proximate location at which the predicted upcoming segment of event starts as a means of determining when the participant is proximate to (e.g., within a predetermined distance or the like) commencing the segment of the event.

The media content delivery application 500 further includes a media content transmission and recording module 530 that is configured to, in response to determining the segment of the event is of interest to one or more users 400 and receiving indication that the impending segment of the event is proximate to commencing, initiate at least one of (i) real-time transmission (e.g., unicast, broadcast, multicast) of a media stream of the segment of the event to one or more of the users 400 and/or (ii) recording and storing of a media file of the segment of the event. In other words, while the participant's media-capturing device may capture the entire event, the captured media may not be streamed (and/or recorded/stored) until user(s) interested in a segment of the event have been identified. In specific embodiments of the invention, the real-time transmission of the media stream of the segment of the event is initiated based on determination of users interested in the event and such users agreeing to receive the transmission (e.g., based on notification of their determined/predicted interest in the segment of the event). In other embodiments of the invention, the segment of the event is recorded and stored in a media file that is accessible to the users 400 for later-in-time consumption of the media content (e.g., viewing a multimedia/video file at a later time).

Referring to FIG. 2 a block diagram is shown of an apparatus 540 for delivering media content, in accordance with embodiments of the present invention. In addition to providing greater detail, FIG. 2 highlights various alternate embodiments of the invention. The apparatus 540 may include one or more of any type of computing device, such as one or more servers, personal computers, mobile computing devices or the like or the like. The present apparatus and methods can accordingly be performed on any form of one or more computing devices.

The apparatus 540 includes a computing platform 542 that can receive and execute algorithms, such as routines, modules, engines and applications. Computing platform 542 includes memory 544, which may comprise volatile and non-volatile memory, such as read-only and/or random-access memory (RAM and ROM), EPROM, EEPROM, flash cards, or any memory common to computer platforms. Further, memory 544 may include one or more flash memory cells, or may be any secondary or tertiary storage device, such as magnetic media, optical media, tape, or soft or hard disk. Moreover, memory 544 may comprise cloud storage, such as provided by a cloud storage service and/or a cloud connection service.

Further, computing platform 542 also includes processor(s) 546, which may be an application-specific integrated circuit ("ASIC"), or other chipset, processor, logic circuit, or other data processing device. Processor 546 or other processor such as ASIC may execute an application programming interface ("API") (not shown in FIG. 2) that interfaces with any resident programs, such as media content delivery application 500, and engines, routines, modules associated therewith or the like stored in the memory 544 of the apparatus 540.

Processor 546 includes various processing subsystems (not shown in FIG. 2) embodied in hardware, firmware, software, and combinations thereof, that enable the functionality of apparatus 540 and the operability of the apparatus 540 on a network (such as distributed communications network 200 shown in FIG. 1). For example, processing subsystems allow for initiating and maintaining communications and exchanging data with other networked devices, such as the databases, servers and user devices 310, 320 and 410 shown in FIG. 1. For the disclosed aspects, processing subsystems of processor 546 may include any subsystem used in conjunction with media content delivery application 500, notification module 550 and performance tracking and comparison module 560 and related algorithms, sub-algorithms, modules, sub-modules, engines and routines thereof.

Computer platform 542 may additionally include communications module (not shown in FIG. 2) embodied in hardware, firmware, software, and combinations thereof, that enables communications among the various components of the apparatus 540, including between the other networked devices. Thus, communication module may include the requisite hardware, firmware, software and/or combinations thereof for establishing and maintaining a network communication connection.

Media content delivery application 500 includes relevancy/interest engine 510 that is configured to determine a user's interest (i.e., relevancy) in an event and/or a segment of an event. In specific embodiments of the invention, the relevancy/interest engine 510 is configured to determine potential users 512 (e.g., a list of candidate users/viewers) from a community of users interested in a topic based on the users interest in the event. The community of users may be a social network of users interested in a topic, such as cycling, running, skiing, virtual reality, gaming, travel or the like.

In specific embodiments of the invention, the determination of a user's interest in the event is made by comparing attributes associated with the potential users 610 to attributes associated with the event 710 and/or the event participant(s) 810. For example, determining which potential users have participated in the same or similar events. In those embodiments in which the event is a physical activity event or a travel event, the event course/path may be predetermined based on participant input and/or previous physical activity/travel events participated in by the participant (e.g., GPS logs of previous physical activities). Further, determining which users are interested in an event may include determining which potential users have participated in a similar physical activity (e.g., similar route/course, similar length/duration, similar elevation/slope, similar conditions and the like). In those embodiments in which the event is a travel event, determining may comprise determining which potential users have participated in a similar travel route (e.g., similar geographic location, similar length/duration, similar conditions or the like). In other embodiments of the invention which the event is a physical activity event, determining which potential users are interested in an event includes determining which potential users have a same or similar performance profile or demographics as the participant(s) (e.g., similar level of fitness, similar age, similar location of residence and the like).

In addition, once the potential users have been determined/identified, the relevancy/interest engine is further configured to determine which of the potential users 512 are users 514 that have an interest in an impending segment of the event. A segment of the event may be any portion of the event (less than the entire event) or the remaining portion of an ongoing event. Segments of the event may be identified based on participant inputs prior to the event (e.g., the participant identifies their event route/course) or impending segments may be predicted based on a participant's previous events (e.g., GPS logs of previous events) or other users previous events (i.e., most likely routes/courses based on overall historical data of multiple users).

In specific embodiments of the invention, the determination of a user's interest in the segment of the event is made by comparing attributes associated with the potential users 610 to attributes associated with the event 710 and/or the event participant(s) 810. For example, determining which users have participated in the same or similar segments of the event. Further, determining which users are interested in a segment of event may include determining which users have participated in a similar identified or predicted segment of a physical activity (e.g., similar identified or predicted route/course, similar identified or predicted length/duration, similar identified or predicted elevation/slope, similar identified or predicted geographic and/or environmental conditions and the like). In those embodiments in which the event is a travel event, determining which users are interested in a segment of event may include determining which users have participated in a similar segment of an identified or predicted travel route (e.g., similar identified or predicted geographic location, similar identified or predicted length/duration, similar identified or predicted geographic and/or environmental conditions or the like). In other embodiments of the invention which the event is a physical activity event, determining which users are interested in a segment of event includes determining which users have a same or similar performance profile as the current or predicted performance profile of the user participant(s) for the segment of the event (e.g., similar predicted speed, similar predicted biometric data (e.g., pulse, heartbeat, temperature and the like).

The media content delivery application 500 further includes segment commencement determination routine 520 that is configured to determine that the participant 300 is proximate to commencing the segment of the event that has been determined to be of interest to one or more of the users 400. Such determination may be made based on location determining mechanisms (e.g., Global Positioning System (GPS) mechanisms) implemented by the participant's mobile communication device 320 or the like, which determine the geophysical location of the mobile communication device and, thus, the location of the user. The user's current location may be compared to a known or proximate location at which the determined segment of event starts to determine when the participant is proximate to (e.g., within a predetermined distance or the like) commencing the segment of the event.

The media content delivery application 500 further includes a media content transmission and recording module 530 that is configured to, in response to determining the segment of the event is of interest to one or more users 400 and receiving indication that the impending segment of the event is proximate to commencing, initiate at least one of (i) real-time transmission (e.g., unicast, broadcast, multicast of a media stream) 532 of media content of the segment of the event to one or more of the users 400 and/or (ii) recording and storing of a media file 534 of the segment of the event. As previously noted, in specific embodiments of the invention, the real-time transmission (e.g., streaming) of the media content of the segment of the event may be communicated to users who have been determined to be interested in the event and have acquiesced in receiving the transmission (e.g., based on notification of their determined interest in the segment of the event, the users have agreed to receive the transmission). In other embodiments of the invention, the segment of the event is recorded and stored in a media file that is accessible to the users 400 for later-in-time consumption of the media content (e.g., viewing a multimedia/video file at a later time).

The memory 544 of apparatus 540 further stores notification module 550 that is configured to generate and initiate communication of various notifications/alerts to the users/viewers and/or participants, in accordance with embodiments of the present invention. Specifically, notification module 550 may be configured to generate and initiate electronic communication of event notifications/alerts 552 to potential users in response to determining potential users from an overall community of users interested in a general topic. The event notification/alert 552 indicates that an event, which the potential user may be interested in, is about to commence. In addition, the event notification/alert 552 may be configured to provide for a user input that confirms the user's acceptable of real-time transmissions of media content in response to a segment of the event being determined to be of interest/relevant to the user. In this regard, the user input (e.g., activating a link in the notification/alert or the like) may result in the user automatically (i.e., without further user intervention) receiving real-time transmissions of media streams of segments of the event that have been/will be determined to be of interest to the user. Automatic receipt of real-time transmission may coincide with automatic launching of an application configured to deliver the real-time transmissions (e.g., a multimedia presentation application or the like).

In addition, notification module 550 may be configured to generate and initiate electronic communication of segment of the event notifications/alerts 555 to users in response to determining that a segment of the event is of interest/relevant to the user. The segment of the event notification/alert 554 indicates that a segment of the event is about to commence and may include the reason why the segment of the event is of interest to the user (e.g., same or similar route/course as previous used/travelled by the user, similar performance profile of the participant, participant is on pace to break a performance record held by the user or the like). In addition, the segment of event notification/alert 554 may be configured to provide for a user input that confirms the user's agreement to receive the real-time transmission of media content associated with the segment of the event. Thus, receipt of the user input (i.e., activating a link in the notification/alert 554 or the like) results in launching of the application configured to deliver the real-time transmissions (e.g., a multimedia presentation application or the like).

Additionally, notification module 550 may be configured to generate and initiate communication of feedback notifications/alerts 556, which are provided to the participant during the event or, more specifically, during the segment of the event and/or provided to the participant at the conclusion of the event or event segment. Feedback notifications/alerts 556 are generated in response to user inputs by the user(s) receiving the real-time transmissions. Thus, the feedback notifications/alerts 556 may provide for personalized messages from the users offering their observations and/or encouragement or providing insight on the upcoming segment/portion of the event (i.e., since the user may have personal experience regarding the route/course, the user may provide the participant with insight as to features/conditions of the route/course that lie ahead). The feedback notifications/alerts 556 may be configured to provide visual and/or audible feedback to the participant. For example, if the event is a physical activity event, the participant and/or user/viewer may configure the feedback notifications/alerts 556 to be limited to audible alerts (e.g., voice messages or the like). However, in other embodiments of the invention, in which the event is a virtual event and/or the participant is equipped with an Optical Head Mounted Display (OHMD), the feedback notifications/alerts 556 may be visual alerts (e.g., text messages or the like).

Additionally, memory 544 of apparatus 540 may store performance tracking and comparison module 560 which is configured to monitor/track the participant's performance parameters 562 during those segments/portions of the event that are being real-time transmitted or recorded. The performance parameters 562 may be associated with the participant's performance of the segment of the event (e.g., speed, time or the like) and/or the participant's biometric data during the segment of the event (e.g., temperature, pulse, heartbeat stress level, emotional state (as determined by GSR sensor or the like). Biometric data may be captured by sensors embedded in a wearable computing device worn by the participant during the event, such as a smart watch, OHMD or the like. In addition, performance tracking and comparison module 560 is configured to access a database of user profiles which store previous performance parameters 564 for previous events conducted by an associated user. Since the user will typically have been designated a user interested in the segment of the event based on previous participation in the same or similar segment of the event, the user profile may include performance data associated with the previous event. In this regard, the performance tracking and comparison module 560 is configured to determine comparative results 566 of the performance tracking by comparing the participant's performance parameters 562 to user(s)' previous performance parameters 564. The comparative results may indicate how the participant(s)' performance of the segment compares to user(s)' performance of the same or similar segments (e.g., compare speed, time, if previous speed/time records were matched or broken or the like), as well as, in some embodiments of the invention, comparison of biometric data (e.g., temperature, pulse, heartbeat, stress level and the like) In addition, notification module 550 may be further configured to generate and initiate electronic communication of a performance comparison notification/alert that is configured to provide the comparative performance results 566 to at least one of the user(s) and/or the participant(s).

Referring to FIG. 3 a flow diagram is shown of a method 900 for delivering media content, in accordance with embodiments of the present invention. The broken-lined entries are indicative of events which are optional events with respect to different embodiments of the invention. At optional Event 910, a community of users interested in a general topic are provided. The community of users may be a social network or the like associated with the general topic. The general topic is associated with events being conducted by participants. For example, the general topic may be running, cycling, skiing, an extreme sport, travelling, virtual gaming or the like. In specific embodiments of the invention, specific users within the community of users are registered users, meaning the registered users have indicated a desire to be notified in response to determining that an event or a segment of an event participated in by someone else (i.e., another member of the community or the like) is of interest to the users so that the users may acquiesce in receiving a real-time transmission of the event or segment or the event and/or access to a recording of the event or segment of the event.

At optional Event 920, potential users from the community of users are identified/determined as having an interest in an event (i.e., the event is relevant to the user) In specific embodiments of the method, the potential users are determined by comparing attributes associated with the potential users to attributes associated with the event and/or the event participant(s). In specific embodiments of the method such a comparison provides for determining which potential users have participated in the same or similar events and which potential users have the same or similar performance characteristics to the event participant(s). In those embodiments in which the event is a physical activity event or a travel event, the event course/path may be predetermined based on participant input and/or predicted based on previous physical activity/travel events participated in by the participant (e.g., GPS logs of previous physical activities in comparison to the user's current GPS location). Further, determining which users are interested in an event may include determining which potential users have participated in a similar physical activity (e.g., similar route/course, similar length/duration, similar elevation/slope, similar conditions and the like). In other embodiments of the invention which the event is a physical activity event or a travel event, determining which potential users are interested in an event includes determining which potential users have a same or similar performance profile or demographics as the participant(s) (e.g., similar level of fitness, similar travel profile, similar demographics and the like).

At optional Event 930, in response to determining potential users having an interest in the event, a notification/alert may be generated and electronically communicated to the users that indicates that an event, which the potential user may be interested in, is about to commence. In addition, the event notification/alert may be configured to provide for a user input that confirms the user's acceptable of real-time transmissions of media content as a result if determining that a segment of the event is of interest/relevant to the user. In this regard, the user input (e.g., activating a link in the notification/alert or the like) may result in the user automatically (i.e., in response to the segment of the event being proximate to commencing and without further user intervention) receiving real-time transmissions of media streams of segments of the event that have been/will be determined to be of interest to the user. Automatic receipt of real-time transmission may provide for, in response to determining that the segment of the event is about to commence, automatically launching an application configured to deliver the real-time transmissions (e.g., a multimedia/video presentation application or the like).

At Event 940, an impending segment of the event is determined to be of interest (i.e., relevant) to one or more of potential users. A segment of the event may be any portion of the event (less than the entire event) or the remaining portion of an ongoing event, which may, in specific embodiments, include the entire event. Segments of the event may be identified based on participant inputs prior to the event (e.g., the participant identifies their event route/course) and/or impending segments may be predicted based on a participant's previous events (e.g., GPS logs of previous events) or other users previous events (i.e., most likely routes/courses based on overall historical data of multiple users). In specific embodiments of the invention, the logic used to determine that an impending segment of the event is of interest to a user is continuously analyzing the predicted or actual upcoming segment of the event to determine if the upcoming segment is of interest to the potential users. It should be noted that the length of a segment may vary depending on what is determined to be of interest to a user (e.g., a segment may be only a few seconds or minutes or a segment may last for a prolonged period of time).

In specific embodiments of the method, the determination of a user's interest in the segment of the event is made by comparing attributes associated with the potential users to attributes associated with the event and/or the event participant(s). For example, determining which users have participated in the same or similar segments of the event. Further, determining which users are interested in a segment of an event may include determining which users have participated in a similar identified or predicted segment of a physical activity (e.g., similar identified or predicted route/course, similar identified or predicted length/duration, similar identified or predicted elevation/slope, similar identified or predicted conditions and the like). In those embodiments in which the event is a travel event, determining which users are interested in a segment of event may include determining which users have participated in a similar segment of an identified or predicted travel route (e.g., similar identified or predicted geographic location, similar identified or predicted length/duration, similar identified or predicted conditions or the like). In other embodiments of the invention which the event is a physical activity event, determining which users are interested in a segment of event includes determining which users have a same or similar performance profile as the current or predicted performance profile of the user participant(s) for the segment of the event (e.g., similar predicted speed, similar predicted biometric data (e.g., pulse, heartbeat, temperature and the like).

At optional Event 950, in response to determining that a segment of the event is of interest to potential users, a segment of the event notification/alert is generated and communicated to the potential users. The segment of the event notification/alert indicates that a segment of the event is about to commence and may additionally include the reason why the segment of the event is of interest to the user (e.g., same or similar route/course as previous used/travelled by the user, similar performance profile of the participant, participant is on pace or predicted to break a performance record held by the user or the like). In addition, the segment of event notification/alert may be configured to provide for a user input that confirms the user's acceptable in receiving the real-time transmission of media content of the segment of the event. Thus, at optional Event 960, a user input may be received from one or more of the potential users that indicates the potential users desire to receive the real-time transmission (and/or access a stored media file) associated with the segment of the event. In specific embodiments of the method, receipt of the user input results in launching of the application configured to deliver the real-time transmissions (e.g., a multimedia presentation application or the like) when the segment is proximate to commencing.

At Event 970, an indication is received that the participant is proximate to commencing the segment of the event that has been determined to be of interest to one or more of the users. Such determination may be made based on location determining mechanisms (e.g., Global Positioning System (GPS) mechanisms) implemented by the participant's mobile communication device or the like, which determine the geophysical location of the mobile communication device and, thus the user. The user's current location may be compared to a known or proximate location at which the determined segment of event starts to determine when the participant is proximate to (e.g., within a predetermined distance or the like) commencing the segment of the event.

At Event 980, in response to determining the segment of the event is of interest to one or more users and receiving indication that the impending segment of the event is proximate to commencing, initiation occurs of at least one of (i) the media content of the segment of the event is transmitted in real-time (e.g., unicast, broadcast, multicast of a media stream) to one or more of the users of interest and/or (ii) a media file of the segment of the event is recorded and stored for subsequent access by the users of interest. As previously noted, in specific embodiments of the invention, the real-time transmission of the media stream of the segment of the event may be communicated to users who have been determined to be interested in the event and have acquiesced in the transmission (e.g., based on notification of their determined interest in the segment of the event, the users have agreed to receive the transmission). In other embodiments of the invention, the segment of the event is recorded and stored in a media file that is accessible to the users for later-in-time consumption of the media content (e.g., viewing a multimedia/video file at a later time).

At optional Event 990, user inputs may be received from the users that provide feedback to the participant during the segment of the event. The inputs may be personalized inputs that provide for personalized messages from the users offering their observations and/or encouragement or providing insight on the upcoming segment/portion of the event (i.e., since the user may have personal experience regarding the route/course, the user may provide the participant with insight as to features/conditions of the route/course that lie ahead). In other embodiments the user inputs may be generic preconfigured inputs that provide generic feedback (e.g., "good job", "way to go" or the like). The user inputs may be configured to provide visual and/or audible feedback to the participant. For example, if the event is a physical activity event, which may prohibit the participant from viewing a display, such as a mobile device display, during the event, the participant and/or user/viewer may configure the feedback to be in an audible format (e.g., voice messages or the like). However, in other embodiments of the invention, in which the event is a virtual event and/or the participant is equipped with an Optical Head Mounted Display (OHMD), the feedback may be configured by the participant and/or user to be visual alerts (e.g., text messages or the like). In specific embodiments of the method, the media presentation application configured to present the real-time transmission of the segment of the event to the users may additionally be configured to present the user feedback within the same user interface as the video presentation, such that all users and/or the participants can view the user feedback and the media content presentation simultaneously.

At optional Event 1000, the participant(s)' performance during the segment of the event is tracked/monitored. Tracking performance may include, but is not limited to, tracking the participant's performance of the segment of the event (e.g., speed, time or the like) and/or tracking the participant's biometric data during the segment of the event (e.g., temperature, pulse, heartbeat stress level, emotional state (as determined by GSR sensor or the like). Biometric data may be captured by sensors embedded in a wearable computing device worn by the participant, such as a smart watch, OHMD or the like worn or in the possession of the participant(s). At optional Event 1010, the participant's tracked performance of the segment of the event is compared to user(s)' previous performance(s) of the same or similar segments. In this regard, such comparison may include accessing a database of user profiles which store previous performance parameters for previous events conducted by an associated user. At optional Event 1020, the user and/or the participant may be notified of the results of the comparison of the performance. The comparative results may indicate how the participant(s)' performance of the segment compares to user(s)' performance of the same or similar segments (e.g., compare speed, time, if previous speed/time records were matched or broken or the like), as well as comparison of biometric data (e.g., temperature, pulse, heartbeat, stress level and the like).

Thus, systems, devices, methods, computer program products and the like described above provide for determining specific segments/portions of the event that are of interest to the users/viewers, such that, real-time transmission of the event may be limited to only those segments/portions of the event that are of interest to the users/viewers. By limiting real-time transmission to those segments of the event which users/viewers have an interest in viewing, the present invention heightens the user-experience by decreasing the amount of time a user/viewer may have otherwise spent viewing the entire event or other segments/portions of the event which are of minimal or no interest to the users/viewers. Moreover, from a technical perspective, limiting the real-time transmission to those segments of the event which users/viewers have an interest in viewing results in less demand on the network and processing resources; lessening the likelihood of transmission delays and the like.

Each processor, transmission point/BS and/or UE described herein generally includes circuitry for implementing audio, visual, and/or logic functions. For example, the processor/transmission point/UE may include a digital signal processor device, a microprocessor device, and various analog-to-digital converters, digital-to-analog converters, and other support circuits. Control and signal processing functions of the system in which the processor resides may be allocated between these devices according to their respective capabilities. The processor/transmission point/UE may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, according to specific embodiments of the invention, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, one or more machines, devices, computer program products, and/or the like), as a method (including, for example, computer-implemented process, and/or the like), as a system (including for example, multiple disparate machines, devices and the like) or as any combination of the foregoing. Accordingly, embodiments of the present invention may take the form of an entirely an entirely software embodiment (including firmware, resident software, micro-code, stored procedures, etc.), an entirely hardware embodiment, or an embodiment combining software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device.

One or more computer-executable program code portions for carrying out operations of the present invention may include object-oriented, scripted, and/or unscripted programming languages, such as, for example, JAVA, PERL, SMALLTALK, C++, SAS, SQL, PYTHON, Objective C, JAVASCRIPT, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for providing media content to one or more users, the method comprising:
    determining that an impending segment of an event comprising a plurality of segments, conducted by a participant, is of interest to one or more users, wherein the determination is based on a comparison between at least one of a plurality of first attributes associated with the impending segment of the event and at least one of a plurality of second attributes associated with the one or more users and another comparison between at least one of a plurality of third attributes associated with a plurality of users and at least one of a plurality of fourth attributes associated with the event, the plurality of third attributes being event attributes associated with previous events conducted by a corresponding one of the plurality of users and the fourth attributes being event attributes associated with the event;

receiving an indication that the impending segment of the event is proximate to commencing; and in response to determining the segment of the event is of interest to the one or more users and receiving the indication, initiating at least one of (i) a real-time transmission of a media stream of the segment of the event to the one or more users, and (ii) recording and storing of a media file of the segment of the event.

2. The method of claim 1, further comprising, in response to determining the segment of the event is of interest to the one or more users and receiving the indication, notifying the one or more users of at least one of (i) the real-time transmission of the media stream of the segment of the event, and (ii) the recording and storing of the media file of the segment of the event.

3. The method of claim 1, further comprising tracking one or more performance parameters of the participant during the segment of the event.

4. The method of claim 3, further comprising comparing the one or more performance parameters of the participant to one or more performance parameters of the one or more users in conducting one or more previous events that are same or similar to the segment of the event.

5. The method of claim 4, further comprising notifying at least one of the participant and the one or more users, of results associated with comparing the one or more performance parameters of the participant to the one or more performance parameters of the one or more users.

6. The method of claim 1, wherein the event is further defined as at least one of a physical activity event and a travel event.

7. The method of claim 6, wherein the event is further defined as one of a virtual physical activity event and a virtual travel event.

8. The method of claim 6, receiving the indication that the impending segment of the event is proximate to commencing further comprises receiving an indication that the participant is located proximate to a starting location of the segment of the physical activity event or travel event.

9. The method of claim 1, wherein the first attributes associated with the impending segment of the event are further defined as route attributes associated with a predicted route for conducting the impending segment of the physical activity event or travel event.

10. The method of claim 9, wherein the second attributes associated with the one or more users are further defined as historical performance attributes associated with the one or more users, wherein the historical performance attributes include one or more previous route attributes associated with previous routes travelled by the one or more users in conducting previous physical activities or previous travels.

11. The method of claim 10, wherein the determination is based on the comparison between at least one of the route attributes associated with the predicted route for conducting the impending segment of the physical activity event or travel event and at least one of the previous route attributes associated with the previous routes travelled by the one or more users in conducting previous physical activities or previous travels.

12. The method of claim 1, wherein the determination is further based on a further comparison between at least one of a plurality of fifth attributes associated with the participant and the at least one of the plurality of second attributes associated with the one or more users.

13. The method of claim 12, wherein the fifth attributes are further defined as at least one of current performance attributes of the participant in conducting the event and predicted performance attributes of the participant foreseen in conducting the segment of the event.

14. A system for providing media content to users, the system comprising:

a computing platform including a memory and at least one processor in communication with the memory;

a media capturing device configured to capture media of an event comprising a plurality of segments;

a relevancy engine stored in the memory, executable by the processor and configured to determine that an impending segment of the event, conducted by a participant, is of interest to one or more users, wherein the determination is based on a comparison between at least one of a plurality of first attributes associated with the impending segment of the event and at least one of a plurality of second attributes associated with the one or more users and another comparison between at least one of a plurality of third attributes associated with a plurality of users and at least one of a plurality of fourth attributes associated with the event, the plurality of third attributes being event attributes associated with previous events conducted by a corresponding one of the plurality of users and the fourth attributes being event attributes associated with the event;

a segment commencement determination routine stored in the memory, executable by the processor and configured to determine that the impending segment of the event is proximate to commencing; and a media transmission and recording module stored in the memory, executable by the processor and configured to, in response to determining the segment of the event is of interest to the one or more users and receiving the indication, initiate at least one of (i) a real-time transmission, to the one or more users, of media captured by the media capturing device associated with the segment of the event, and (ii) record and store the media captured by the media capturing device associated with the segment of the event.

15. The system of claim 14, further comprising a notification module stored in the memory, executable by the processor and configured to, in response to determining the segment of the event is of interest to the one or more users and receiving the indication, notify the one or more users of at least one of (i) the real-time transmission of the media, and (ii) the recording and storing of the media.

16. The system of claim 14, further comprising a performance tracking and comparison module stored in the memory, executable by the processor and configured to:

track one or more performance parameters of the participant during the segment of the event; and compare the one or more performance parameters of the participant to one or more performance parameters of the one or more users in conducting one or more previous events that are same or similar to the segment of the event.

17. A computer program product for providing media content to users comprising a non-transitory computer-readable storage medium having computer-executable instructions for:

determining that an impending segment of an event comprising a plurality of segments, conducted by a participant, is of interest to one or more users, wherein the determination is based on a comparison between at least one of a plurality of first attributes associated with the impending segment of the event and at least one of a plurality of second attributes associated with the one or more users and another comparison between at least one of a plurality of third attributes associated with a plurality of users and at least one of a plurality of fourth attributes associated with the event, the plurality of third attributes being event attributes associated with previous events conducted by a corresponding one of the plurality of users and the fourth attributes being event attributes associated with the event;

receiving an indication that the impending segment of the event is proximate to commencing; and in response to determining the segment of the event is of interest to the one or more users and receiving the indication, initiating at least one of (i) a real-time transmission of a media stream of the segment of the event to the one or more users, and (ii) recording and storing of a media file of the segment of the event.

18. The computer program product of claim 17, wherein the computer-executable instructions are further configured for, in response to determining the segment of the event is of interest to the one or more users and receiving the indication, notify the one or more users of at least one of (i) the real-time transmission of the media, and (ii) the recording and storing of the media.

* * * * *